United States Patent Office 3,376,248
Patented Apr. 2, 1968

3,376,248
COPOLYMERS OF ALPHA-OLEFINS AND OLEFIN-SUBSTITUTED CYCLOALKANES AND FIBERS THEREFROM
Earl V. Kirkland, Millington, N.J., assignor to Celanese Corporation, a corporation of Delaware
No Drawing. Filed Oct. 2, 1964, Ser. No. 401,217
20 Claims. (Cl. 260—33.6)

ABSTRACT OF THE DISCLOSURE

Crystalline copolymers are prepared by polymerizing in the presence of a Ziegler-Natta type catalyst a mixture comprising (a) from 5–95% of 3-methyl-1-butene and/or 4-methyl-1-pentene, and (b) from 95–5% of at least one olefin-substituted cycloalkane selected from the group consisting of vinylcycloalkanes and allylcycloalkanes. Fibers are formed from spinning solutions of the copolymers.

---

This invention relates broadly to olefinic copolymer compositions and to a method of making the same. More particularly it relates to novel, crystalline (substantially crystalline), fiber-formable (fiber-forming) olefinic copolymers. Still more particularly the invention is concerned with compositions comprising or consisting essentially of a copolymer obtained by polymerization of a polymerizable mixture of copolymerizable ingredients including (A) at least one olefin selected from the group consisting of 3-methyl-1-butene and 4-methyl-1-pentene and (B) at least one onefin-substituted cycloalkane selected from the group concisting of vinylcycloalkanes and allylcycloalkanes containing from 5 to 7 carbon atoms, inclusive, in the cycloalkane grouping thereof. The ingredients of (A) and (B) are present in the aforesaid polymerizable mixture in the ratio of, by weight, from 5 to 95% of the olefin of (A) to from 95 to 5% of the olefin of (B).

The scope of the invention also includes compositions of the kind described above in the form of filamentary materials; and, also, spinning solutions comprising a solvent, more particularly a solvent including a halogenated (chlorinated, brominated, fluorinated, iodinated) ethylene, e.g., trichloroethylene, having dissolved therein a high-melting, fiber-formable copolymer of the kind broadly described above and more specifically hereafter.

The scope of the invention additionally includes a method of producing a high-melting (more particularly a high-melting, fiber-formable) copolymer by polymerizing, in the presence of a suitable catalyst, more particularly a Ziegler-Natta catalyst, a polymerizable mixture of copolymerizable ingredients including olefins such as those described under (A) and (B), supra.

It was suggested prior to the present invention to prepare fiber-formable olefinic homopolymers and copolymers, e.g., homopolymers and copolymers of propylene. It was also suggested that crystalline and crystallizable copolymers be prepared from two or more branched-chain alpha-olefins (see, for example, U.S. Patent No. 3,091,601 dated May 28, 1963). However, to the best of my knowledge and belief it was not known or suggested prior to the instant invention that high-melting, crystalline (including potentially crystalline), fiber-formable copolymer compositions could be prepared by polymerizing a mixture of the particular olefinic ingredients in the particular ranges of the proportions set forth in the first paragraph of this specification to obtain copolymers having the particular and unobvious properties herein set forth, and which make them particularly valuable for use in industry.

It is a primary object of the present invention to prepare a new class of copolymers or interpolymers for domestic and industrial use.

Another object of the invention is to improve the usefulness of certain specific olefins, viz., 3-methyl-1-butene, 4-methly-1-pentene, and the vinylcycloalkanes (monovinylcycloalkanes) and allylcycloalkanes (monoallylcycloalkanes) containing from 5 through 7 carbon atoms in the cycloalkane grouping thereof whereby their field of utility is enhanced.

Another object of the invention is to provide a new class of high-melting, crystalline (or potentially crystalline), solid copolymers that can be readily fabricated (e.g., in fiber or other form) to yield valuable products such as textile materials in filamentary (i.e., mono- or multifilamentary) form, or in the form of yarns, ropes, cords, tapes, woven or non-woven fabrics, or in the form of films, sheets, cast or molded articles, etc.

Another object of the invention is to provide extrudable compositions, more particularly spinning solutions, from which filamentary materials, films and other products of the kind aforementioned can be made.

Another object of the invention is to provide a method whereby the new copolymers of this invention can be prepared.

Still other objects of the invention will be apparent to those skilled in the art from the following more detailed description including the examples.

The foregoing objects are attained by polymerizing in the presence of a suitable polymerization catalyst, more particularly a Ziegler-Natta catalyst, a polymerizable mixture of copolymerizable ingredients of the kind and in the amount set forth in the first paragraph of this specification.

The catalyst used in practicing this invention may be, for example, one composed of at least three components, viz.:

(1) A compound of at least one metal from Groups Ia or IIb of the Periodic Table (Mendeléeff) in which an atom of said metal is attached directly to a carbon atom and which preferably contains no other metal. Examples of contemplated compounds are the alkyls, the aryls and the alkyl halides of lithium, sodium, potassium, beryllium and magnesium. A preferred group of compounds is the lithium alkyls wherein the alkyl groups contain from 1 to 10, and preferably from 3 to 10 carbon atoms.

(2) A compound of at least one metal of Group IIIb of the Periodic Table (Mendeléeff) in which an atom of said metal is attached directly to a carbon atom and which preferably contains no other metal, e.g., the alkyls, the aryls and the alkyl halides of aluminum, gallium and indium such as aluminum trialkyls and traryls or mixed alkylaryls. A preferred group of compounds is the aluminum trialkyls wherein the alkyl groups contain from 1 to 10 carbon atoms.

(3) As an oxidizing component, a compound composed of one or more transition heavy metals from Groups IVa, VIa, VIIa or VIII of the Periodic Table (Mendeléeff) wherein said element has a valence above its most reduced state. The metal may be attached, for example, to a halide, oxyhydrocarbon, e.g., alkoxide, or oxide group. Some specific compounds are titanium tri- and tetrachloride, zirconium tetrabromide, chromyl chloride, chromyl acetate, vanadium trichloride and vanadium oxychloride. The oxidizing component may also be a compound having a homogeneous crystalline structure and a unique and characteristic X-ray diffraction pattern, e.g., one that is prepared by reacting aluminum metal with titanium tetrachloride in the presence of an organic solvent and, if desired, aluminum chloride as a catalyst at a temperature of 80° to 220° C.

The aforementioned catalyst system may be prepared by first contacting the oxidizing component, e.g., titanium tetrachloride, with the Group IIIb metal compound, e.g., an aluminum trialkyl, to form a pre-catalyst to which is then added the Group Ia or IIb metal compound, e.g., a lithium alkyl. Considerably higher yields are obtained when the catalyst is prepared in this manner than when the components are combined in some other order.

In the preparation of copolymers of a vinyl- or an allyl-substituted cycloalkane, specifically vinylcyclohexane, and, for example, an olefin such as 4-methyl-1-pentene, good results have been obtained using a catalyst combination consisting of titanium trichloride (added as a solid) and diethyl aluminum chloride (added in solution in a hydrocarbon) in a molar ratio of

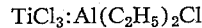

$TiCl_3 : Al(C_2H_5)_2Cl$ of about 1:2, respectively. These results were obtained when employing a molar ratio of $TiCl_3$: total monomers of 0.02–0.18:1, respectively. Generally, the initial concentration of monomer in the reaction slurry was from about 8 to 20% by weight. The hydrocarbon solvent had little or only an incidental effect on the reaction. It will be understood, of course, that satisfactory copolymerization reactions with this catalyst system are not necessarily limited to the ranges and concentrations just mentioned.

With the polymerization-catalyst systems used in practicing this invention it is possible to obtain relatively high yields of polymers of the kind with which the invention is concerned and which have superior properties, e.g., high melting-points and inherent viscosities (I.V.'s).

In carrying out the polymerization process, the components of the catalyst are usually contacted with the monomeric material while agitating the mass in the reactor, preferably in the presence of an organic solvent. After the reaction has proceeded to the desired point it is interrupted, and the polymer is precipitated by adding to the mass a non-solvent for the polymer, e.g., methanol. The polymer is then separated and washed. The process may be carried out batchwise wherein the monomer is added to a mass of catalyst in an autoclave until the desired amount of polymer is produced, after which the reaction is interrupted and the polymer precipitated. Or, the process may be carried out continuously, e.g., by charging streams of catalyst-containing solvent and monomer into the bottom of the reactor and continuously withdrawing the mass comprising polymer, catalyst, unreacted monomer and solvent from the top of the reactor.

In the preparation of the catalyst, the Group IIIb metal compound may be used, for example, in an amount of 2.5 to 50, preferably 5 to 10, moles per 1000 liters of solvent if a solvent is used. The Group Ia or IIb metal compound may be used in an amount of 0.5 to 10, preferably 1.2 to 4, moles per mole of Group IIIb metal compound. The amount of transition heavy metal oxidizing component may be, for instance, in the range of 0.5 to 10, preferably 1 to 4, moles per mole of Group IIIb metal compound.

The temperature of polymerization may be, for example, in the range of 10° to 120° C., preferably 20° to 50° C. The pressure of polymerization may be, for instance, in the range of from atmospheric pressure to about 400 p.s.i.g.

In carrying out the polymerization process it is particularly advantageous that the Group IIIb metal compound and the Group Ia or IIb metal compound be separately added to the polymerization reaction zone. In this way the catalyst components may be added to the reaction zone in the form of liquids that are much more easily injected into the reactor (from which atmospheric contaminants must be rigidly excluded) than if the catalyst were in the form of a slurry.

ticularly advantageous that the Group IIIb metal come.g., lithium alkyl, may be added in its pure form or mixed with an organic solvent, e.g., a hydrocarbon solvent such as heptane, pentane, cyclohexane or benzene. If an organic solvent is used, it may be mixed with any proportion of Group Ia or IIb metal compound, e.g., the latter may be present in a concentration of 10 to 50% by weight.

Similarly, the Group IIIb metal compound, e.g., aluminum trialkyl may be used by itself or mixed in any proportion, but suitably in the form of a solution containing 10 to 50% by weight of Group IIIb metal compound in an inert organic solvent, e.g., a hydrocarbon solvent such as those mentioned above in connection with the addition of the Group Ia or IIb metal compound.

The transition heavy metal oxidizing component, e.g., titanium tetrachloride, may also be added to the reaction zone separately, or may be mixed, for example, with the Group IIIb metal compound solution prior to its being injected into the reaction zone. The transition heavy metal compound may also be used in its pure form or as a solution having any concentration, e.g., 10 to 50% by weight of the oxidizing component in an inert organic solvent which may be one of the same class which is suitable for use in the addition of the other catalyst components.

The monomeric material may be added to the reaction zone before or after the formation of the catalyst or at any point during the formation of the catalyst, i.e., with or in between the addition of the catalyst components.

Illustrative examples of other catalysts and catalyst systems that may be used are given in the prior art, e.g., in the aforementioned U.S. Patent No. 3,091,601, and which by this cross reference is included in the disclosure of this specification.

The copolymers of this invention, which are thermoplastic, have superior properties as compared with the typical, commercially-available copolymers. In general, they have a crystalline melting point of the unoriented copolymer (based on loss of birefringence) ranging between about 210° or 220° C. and about 330° C. or higher. In the preferred compositions this crystalline melting point is at least 250° C., and preferably at least 300° C., e.g., up to about 330° C. or 340° C. or higher. The inherent viscosity (I.V) measured as a 0.1% solution in a solvent such as trichloroethylene at 25° C. ranges from about 0.5 to about 5.0. For many purposes polymer with an inherent viscosity ranging from about 2.0 to about 4.0 is preferred, although polymer viscosities outside this range may be preferred for certain specialized applications.

The inherent viscosity may be controlled to a considerable degree by reaction time or conversion of monomer. At low-conversion and short-reaction periods polymer with a low I.V. is formed. At somewhat longer reaction periods and conversions, higher I.V. polymer is formed. However, the I.V. cannot be increased indefinitely, although polymer with suitable I.V. for all known purposes can be made with suitable and appropriate reaction time, temperature, conversion and catalyst-to-monomer ratios.

The reaction time and extent of monomer conversion also affects the ratio of monomers incorporated in the polymer product during certain types of synthesis operations. This is shown by making semi-log plots of unreacted monomer vs. time. In all the tests, a small amount of monomer was reacted for several hours before the time scale of the plot. The major portion of monomer was then added and the plotted data were obtained by withdrawing an aliquot of reaction slurry at regular intervals and analyzing each sample for monomer by gas-phase chromatography. The amount of unreacted monomer at any time of sampling was calculated from the analysis and the total amount of monomer charged.

In Test A the aluminum diethyl chloride charge was 438 grams dry heptane solvent, 34.2 millimoles $TiCl_3$, 96.6 millimoles aluminum diethyl chloride, and about 0.05 mole vinylcyclohexane. The system was purged thoroughly with pure nitrogen, and care was taken to prevent air and moisture from entering the system. After about 24 hours, about 0.5 mole vinvylcyclohexane was added and the homopolymerization was continued at about 26° C. While the catalyst concentration was high, the reaction was not rapid because of the relatively low temperature. The results of the test showed that the polymerization is time-dependent.

In Test B, the monomeric material was vinylcyclohexane and 4-methyl-1-pentene. The molar ratio of vinylcyclohexane, 4-methyl-1-pentene, titanium trichloride and aluminum diethyl chloride was 0.268, 0.283, 0.035 and 0.072, respectively. A plot of the test shows that 4-methyl-1-pentene reacted appreciably faster than vinylcyclohexane. During the 50-hour period of time covered by the plot, the initial polymer consequently contained a predominance of 4-methyl-1-pentene units, while the polymer formed during the later periods contained mostly vinylcyclohexane units. The resulting copolymer has a random and uneven distribution of monomer units in the polymer chains, and this may be desirable for certain applications. However, a random polymer with a more even distribution of monomer units may be synthesized in a continuous reactor with continuous withdrawal of polymer slurry and continuous addition of charge materials. The ratio of 4-methyl-1-pentene to vinylcyclohexane in the copolymer produced in this manner would be higher than in the charge.

4-methyl-1-pentene and allylcyclohexane were copolymerized (Test C) in a manner similar to that described above with regard to Test B. A plot of the reaction shows that 4-methyl-1-pentene anl allylcyclohexane also do not copolymerize at the same rate. The latter monomer reacts somewhat faster, and the ratio of allylcyclohexane to 4-methyl-1-pentene adding to the growing chain is somewhat different during the early and later stages of copolymerization. Again, more consistent (but random) copolymers can be formed in a continuous polymerization operation, and the ratio of comonomers in the product can be controlled by suitable adjustment of the ratio of monomers in the feed.

Monomer units may be more or less separately and alternately added to the growing polymer chain to yield copolymers with less randomness, i.e., block copolymerization. Specifically, a small amount of one monomer may be polymerized to an appreciable conversion and the other comonomer polymerized similarly in a stepwise reaction. Alternate addition of comonomers, with extensive conversion before succeeding additions, was the procedure followed in Test D which involved the copolymerization of vinylcyclohexane and 4-methyl-1-pentene. In this test, reaction was continued for 10 days while checking the concentration of the two monomers. From the data it appears that blocks were formed of vinylcyclohexane units and, on alternate days, of predominantly 4-methyl-1-pentene units plus a minority of vinylcyclohexane units.

The copolymers of this invention may be fabricated in the form of filaments, films, rods and other shaped products. For example, they may be wet- or dry-spun to form filamentary materials.

The dissolution of the copolymer in a suitable solvent, examples of which have been given hereinbefore, is accelerated by using a copolymer that is in finely divided state, e.g., one which, if not in finely divided state as originally formed, has been ground so that all or substantially all of it will pass through a U.S. Standard Sieve Series No. 50 screen. It is also usually desirable to agitate the mass, as by mechanical stirring, while dissolving the copolymer in the solvent. To avoid or minimize discoloration of the copolymer, it is generally advantageous to employ the lowest possible temperature in effecting dissolution that is consistent with practical considerations, e.g., the time required for effecting solution, etc.

The proportions of the copolymer in the solvent, e.g., trichloroethylene, may be varied widely, depending mainly upon the particular use for which the composition is intended. If the solvent, e.g., a mono-, di- or trichloro-, tribromo- or trifluoroethylene, is to be used primarily as a solvent for the copolymer, which solvent is subsequently removed after the copolymer has been shaped into a film, filament, thread, yarn, tube or other shaped article, then the copolymer usually constitutes at least about 4 or 5%, but less than about 35%, e.g., from about 5 to about 20 or 25%, by weight of the composition. If the solution is to be used in the spinning of filaments (mono- or multifilaments) or the casting or films, it is generally preferred that the copolymer constitute at least 7 or 8%, e.g., from 10 to 15 or 20% by weight of the composition. The aforementioned ranges of proportions are mentioned as indicative of proportions that may be employed in forming solutions of the copolymer, and this embodiment of the invention is obviously not limited to the use of only such proportions. Especially in spinning and casting applications of the compositions, the important factor is that the proportions be such that the viscosity of the composition at the operating temperature is within a workable range.

The solutions described above may be used in producing various fabricated structures in accordance with general techniques and using apparatus now generally known to those skilled in the art, the detailed operating conditions being suitably modified where necessary. In one method of making extruded articles such, for example, as filaments, etc., the solution of the copolymer in a solvent, e.g., trichloroethylene (heated to, for instance, 75°–85° C.), is extruded through a spinneret or die into a liquid coagulating bath which will coagulate the copolymer in the spinning solution. The liquid into which the spinning solution is extruded is one which is miscible with the solvent, specifically trichloroethylene, and which, as a result of extracting the solvent, is capable of coagulating the copolymer. Any liquid which is thus capable of coagulating the copolymer may be employed, but preferably the liquid coagulant is one that has no harmful effect upon the copolymer. When the solvent is trichloroethylene, a suitable liquid coagulant is one comprising or consisting essentially of ethanol. Higher alcohols, alone or admixed with ethanol, also may be used. Illustrative examples of solvents for the copolymer and of liquid coagulants are as follows:

| Solvent for copolymer: | Liquid coagulant |
| --- | --- |
| Perchloroethylene | Isopropanol |
| Trichloroethylene | Isopropanol |
| Trichloroethylene | Methanol |
| Trichloroethylene-isopropanol | Isopropanol |
| Perchloroethylene-dichloromethane | Ethanol |

It will be understood, of course, by those skilled in the art that the temperature of the liquid coagulating or precipitating bath should be such as to dissolve the solvent from the extruded mass most rapidly and effectively. The length of travel of the shaped article through the bath may be varied as desired or as conditions may require, but in all cases should be sufficiently long to effect solidification of the copolymer and to extract from the extruded mass all of the solvent; or, if desired, only a part of it, leaving the remainder, e.g., from 0.5 to 1% to 15 or 20% or more, by weight of the whole, of solvent in the extruded mass so that it may function as a plasticizer for the copolymer. One or more sheaves or rolls may be positioned in the bath so as to guide the filament during its formation and to keep it under tension thereafter.

The spun filament or extruded article is preferably treated in, or after leaving, the coagulating bath in order to orient the molecules along the fiber axis and thereby to increase the tensile strength and otherwise to improve the properties of the spun material. Orientation may be effected by stretching the filament (mono- or multifilament) at any suitable stage of the spinning operation, but preferably while the spun filament or thread still contains at least some of the solvent. Stretching may be accomplished by passing the thread or yarn between two or more positively driven rollers or godets, the peripheral speeds of which are adjusted so that the thread is stretched to the desired degree.

The amount of stretch that is applied to the filament or strand may be varied widely, but in all cases should be sufficient to cause appreciable orientation of the molecules and an improvement in the properties of the material undergoing treatment. The amount of tension to which the filamentary material is subjected obviously should not be so great as to cause it to break. Depending, for example, upon the type or kind of material being stretched and the particular properties desired in the finished product, the amount of stretch may vary, for instance, from 50%, preferably from 100 or 200%, up to 1000%, or more of that of the original length of the filament or strand. The stretch may be applied gradually by passing the filament or thread over a plurality of godets having increasing peripheral speeds. The stretched thread may be wound upon a spool or it may be collected in a centrifugal pot, whereby twist advantageously is applied to the thread. Alternatively, the stretched thread may be led over a thread-storage device on which it may be treated to remove all or part of the coagulant and/or solvent, after which it may be continuously dried, oiled and taken up on a twisting device such, for instance, as a ring twister.

The extruded filament or thread may be given part or all of its total stretch in a liquid medium such as that which constitutes the coagulating bath, or in any other suitable medium, and at a suitable temperature. Thus, the stretch may be applied while the strand is being passed through a gaseous medium, e.g., air, nitrogen, flue gases, etc., or through a liquid medium, e.g., water, or such media as are employed for coagulating the copolymer. To obviate or minimize discoloration of the copolymer, the temperature of the medium in which the copolymer is stretched and the rate of travel of the strand through the medium should be so adjusted that overheating of the strand does not occur. Ordinarily, the temperature of the medium in which stretching is effected is at least about 20° C. below its softening temperature, e.g., from about 70° C. to about 200° C.

The highly stretched product is usually strong, tough and pliable, and shows a high degree of orientation along the fiber axis by X-ray diffraction.

In order that those skilled in the art may better understand how the present invention can be carried into effect, the following examples are given by way of illustration and not by way of limitation. All parts and percentages are by weight unless otherwise stated. The apparatus and general procedure will first be described and pertinent comments made.

A 2-liter fluted flask was fitted with a stirrer, a tube that extended nearly to the bottom of the flask for admitting gas, a reflux condenser with a stopcock at the top and an opening for the addition of catalyst and monomeric material. Although a simple opening fitted with a cap or stopper may be used, the preferred opening for the addition of monomer(s) and catalyst is a simple tube closed during the reaction with a serum stoper so that catalyst and monomer(s) may be introduced via a syringe and a hypodermic needle stuck through the serum stopper. The apparatus must be free of air, water and similar reactive substances, which will react with the catalyst, before the reaction is started. This was accomplished by thoroughly blowing the apparatus with an inert gas such as nitrogen. Preferably nitrogen free of oxygen and water is used, and the flask is warmed during the degassing.

An unreactive solvent, specifically heptane, was added to the system which was again thoroughly degassed. About 1100 ml. dry solvent was usually employed. Although the catalyst components may be mixed in various ways, generally the titanium trichloride was first added to the solvent to form a slurry. Usually finely divided, aluminum activated titanium trichloride was added either in a solid form or as a slurry in heptane. At this time, after degassing the system with inert gas, the system may be closed for the duration of the test, or passage of the inert gas may be slowly continued through the slurry.

Example I

Five different copolymers (random copolymers) of vinylcyclohexane (VCH) and 4-methyl-1-pentene (4MP) are produced using monomer proportions ranging from 80 to 9% of VCH and, correspondingly, from 20 to 91% of 4MP. These copolymers are identified as A, B, C, D, and E in the table forming a part of this example.

At least 2 moles aluminum diethyl chloride per mole $TiCl_3$ (i.e., a molar ratio of at least 2 moles of the former per mole of the latter) is added to the system previously described via a syringe and hypodermic needle. Since aluminum diethyl chloride is a liquid under normal conditions it may be added without dilution, if desired. However, because of the extremely flammable nature of aluminum diethyl chloride, it is preferred to use a solution of the compound in an inert solvent, more particularly an inert hydrocarbon solvent such as heptane, in order to minimize the fire hazard. A solution of about 1 molar aluminum diethyl chloride in heptane is used, but even though the aluminum alkyl compound is diluted it must be kept away from air.

A total of about 1.4 moles of monomeric material is added to the system via a syringe and hypodermic needle. The mole ratio of $TiCl_3$: total monomers is about 0.03–0.04:1, respectively. The respective weight ratios of vinylcyclohexane to 4-methyl-1-pentene in the charge to the system, and from which the copolymers described in the table are obtained, are: A, 7.2:1; B, 3.6:1; C, 1.2:1; D, 0.4:1; and E, 0.2:1. The slurry is stirred for about 16 hours at about 26°–28° C.

When poured into an excess of methanol the reaction slurry is deactivated and the copolymer is precipitated. Continuous extraction with heptane in a Soxhlet extractor for 2 hours separates some low-molecular-weight material that is crystalline. The heptane-insoluble copolymer contains some catalyst residue that may be detrimental to the copolymer at elevated temperatures. The catalyst residue may be removed from the copolymer by extraction with hot butanol containing 5–10% concentrated HCl.

The composition and properties of the various copolymers are described in the following table.

TABLE

| Copolymer | A | B | C | D | E |
|---|---|---|---|---|---|
| Heptane insoluble, wt. percent | 89.4 | 89.0 | 92.0 | 87.9 | 92.8 |
| I.V. (in trichloroethylene) | 3.05 | 2.90 | 3.10 | 3.30 | 3.75 |
| Monomer proportion, wt. percent | | | | | |
| VCH | 80 | 66 | 44 | 17 | 9 |
| 4-MP | 20 | 34 | 56 | 83 | 91 |
| M.P. ° C. (birefringent) | 325–330 | >250 | 210–300 | 230–235 | 220–225 |
| Softening range, ° C | <325 | >220 | | | |
| Ash, wt. percent | 0.013 | 0.015 | 0.004 | 0.004 | 0.008 |
| Yield, approx. wt. percent | 60 | 56 | 70 | 69 | 70 |

Although all the copolymers described in above table are completely soluble in a halogenated ethylene, specifically trichloroethylene, solubility studies indicate that the individual copolymers contain a small amount of polymeric materials having an I.V. appreciably higher than the average I.V. The amount of this higher-molecular-weight fraction can be appreciably reduced by pre-initiating polymerization. More particularly, the system, solvent and catalyst used are the same as in 1-A, and about 0.15-0.25 mole (i.e., about 11-18%) of total comonomers is charged to the system and reacted for from about 3 to 24 hours. Then the bulk of the monomeric material is added in an amount such that the total amount of monomers added is the same as that employed in Example 1-A. The resulting copolymer yields clear, gel-free solutions when dissolved in trichloroethylene at about 70°-80° C.

Example II

Essentially the same procedure is followed as described under Example I with the exception that 3-methyl-1-butene is substituted for 4-methyl-1-pentene. A series of crystalline copolymers having properties similar to those of Example I is obtained.

Example III

Essentially the same procedure is followed as set forth under Example I with the exception that a different vinylcycloalkane is used. Specifically in one series the vinylcyclohexane is replaced by vinylcyclopentane, while in another series it is replaced by vinylcycloheptane. The copolymers from both series are characterized by their crystalline properties and relatively high melting points, thereby making them eminently suitable for use as fiber-formable materials.

Example IV

Essentially the same procedure is followed as described in Example I with the exception that allylcyclohexane is used in place of vinylcycloalkane, and the period of copolymerization is from 24 to 48 hours instead of 16 hours. Similar results are obtained.

Example V

Solutions of the copolymers of this invention, specifically the copolymers of Examples 1-A, 1-B and 1-C, are formed satisfactorily be effecting dissolution at elevated temperatures, e.g., at about 70°-80° C.

In making such solutions finely divided copolymer and a solvent such as trichloroethylene are mixed in a closed tube and heated on a steam bath while agitating the solution. Solutions in trichloroethylene are best formed in closed tubes because the high vapor pressure of the solvent promotes the formation of "skin." In this manner, clear solutions containing about 10% solids, are formed. More concentrated solutions are formed in autoclaves which can be warmed to 110° C. or higher. The copolymer solutions are not stable at room temperature and, in the case of copolymers containing about 40% or more of 4-methyl pentene-1, will gel when cooled to room temperature. Consequently, dope extrusion is best accomplished shortly after dope preparation and without cooling the solution.

Example VI

A spinning solution is prepared by dissolving a copolymer prepared as described in 1-B in trichloroethylene at 75° C.-80° C. to form a solution containing about 6% of vinylcyclohexane-4-methyl-1-pentene copolymer. This solution is filtered, de-aerated and wet-spun at 75° C. through a one-hole spinneret having an aperture diameter of 0.1 micron into a coagulating bath of ethanol at a temperature of about 60° C. (The general procedure is essentially the same as described in the portion of this specification prior to the examples.) The coagulated filament is stretched, washed and dried, yielding a monofil having good flexibility and tensile-strength characteristics.

It is to be understood that the foregoing detailed description is merely by way of illustration and that many variations may be made therein without departing from the spirit of my invention.

The embodiments of the invention in which an exclusive property or privilege is claimed are defined as follows:

1. A composition comprising essentially a crystalline, fiber-formable copolymer obtained by polymerization of a polymerizable mixture of copolymerizable ingredients consisting essentially of (A) at least one olefin selected from the group consisting of 3-methyl-1-butene and 4-methyl-1-pentene and (B) at least one olefin-substituted cycloalkane selected from the group consisting of vinylcycloalkanes and allylcycloalkanes containing from 5 to 7 carbon atoms, inclusive, in the cycloalkane grouping thereof, the ingredients of (A) and (B) being present in the said polymerizable mixture in the ratio of, by weight, from 5 to 95% of the olefin of (A) to from 95 to 5% of the olefin of (B), said copolymer in unoriented state having a crystalline melting point, based on loss of birefringence, ranging between about 210° and 340° C., and an inherent viscosity measured as a 0.1% solution in trichloroethylene ranging from about 0.5 to about 5.0.

2. A composition as in claim 1 wherein the olefin of (A) is 3-methyl-1-butene.

3. A composition as in claim 1 wherein the olefin of (A) is 4-methyl-1-pentene.

4. A composition as in claim 1 wherein the olefin-substituted cycloalkane of (B) is vinylcyclohexane.

5. A composition as in claim 1 wherein the olefin-substituted cycloalkane of (B) is allylcyclohexane.

6. A composition comprising a crystalline, fiber-formable, trichloroethylene-soluble copolymer obtained by polymerization of a polymerizable mixture of copolymerizable ingredients consisting essentially of 4-methyl-1-pentene and vinylcyclohexane in the ratio of, by weight, from about 20% to about 91% of the former to from about 80% to about 9% of the latter, said copolymer in unoriented state having a crystalline melting point, based on loss of birefringence, ranging between about 210° and about 330° C., and an inherent viscosity measured as a 0.1% solution in trichloroethylene ranging from 2.90 to 3.75.

7. A composition as in claim 6 wherein the 4-methyl-1-pentene and vinylcyclohexane are employed in the ratio of, by weight, from about 20% of the former to about 80% of the latter.

8. A composition as in claim 6 wherein the 4-methyl-1-pentene and vinylcyclohexane are employed in the ratio of, by weight, from about 34% of the former to about 66% of the latter.

9. A composition as in claim 6 wherein the 4-methyl-1-pentene and vinylcyclohexane are employed in the ratio of, by weight, from about 56% of the former to about 44% of the latter.

10. A composition as in claim 6 wherein the 4-methyl-1-pentene and vinylcyclohexane are employed in the ratio of, by weight, from about 83% of the former to about 17% of the latter.

11. A composition as in claim 6 wherein the 4-methyl-1-pentene and vinylcyclohexane are employed in the ratio of, by weight, from about 91% of the former to about 9% of the latter.

12. A composition as in claim 1 wherein the copolymer is a random copolymer of the defined ingredients.

13. A composition as in claim 1 wherein the copolymer is in the form of a filamentary material.

14. A solid, substantially crystalline, fiber-formable copolymer obtained by polymerization of a polymerizable mixture of copolymerizable ingredients consisting essentially of (A) an olefin selected from the group consisting of 3-methyl-1-butene and 4-methyl-1-pentene and (B) vinylcyclohexane, the ingredients of (A) and (B) being present in the said polymerizable mixture in the ratio of, by weight, from about 20% to about 91% of the olefin of (A) to from about 80% to about 9% of the vinylcyclohexane of (B), said copolymer in unoriented state having a crystalline melting point, based on loss of birefringence, ranging between about 210° and 340° C., and an inherent viscosity measured as a 0.1% solution in trichloroethylene ranging from about 2.0 to about 4.0.

15. A solid, substantially crystalline copolymer as in claim 14 wherein the olefin of (A) is 4-methyl-1-pentene.

16. A spinning solution comprising a solvent including (A) a halogenated ethylene and (B) a high-melting, crystalline, fiber-formable copolymer dissolved in said solvent, said copolymer being a product of polymerization of a polymerizable mixture of copolymerizable ingredients including (A) at least one olefin selected from the group consisting of 3-methyl-1-butene and 4-methyl-1-pentene and (B) at least one olefin-substituted cycloalkane selected from the group consisting of vinylcycloalkanes and allylcycloalkanes containing from 5 to 7 carbon atoms, inclusive, in the cycloalkane grouping thereof, the ingredients of (A) and (B) being present in the said polymerizable mixture in the ratio of, by weight, from 5 to 95% of the olefin of (A) to from 95 to 5% of the olefin of (B), said copolymer having the melting point and inherent-viscosity characteristics of the copolymer defined in claim 1 and constituting from about 6 to 20% by weight of the said solution.

17. A spinning solution as in claim 16 wherein the halogenated ethylene is trichloroethylene.

18. The method of producing a high-melting crystalline, fiber-formable copolymer which comprises polymerizing, in the presence of a Ziegler-Natta catalyst, a polymerizable mixture of copolymerizable ingredients including (A) at least one olefin selected from the group consisting of 3-methyl-1-butene and 4-methyl-1-pentene and (B) at least one olefin-substituted cycloalkane selected from the group consisting of vinylcycloalkanes and allylcycloalkanes containing from 5 to 7 carbon atoms, inclusive, in the cycloalkane grouping thereof, the ingredients of (A) and (B) being present in the said polymerizable mixture in the ratio of, by weight, from 5 to 95% of the olefin of (A) to from 95 to 5% of the olefin of (B), said copolymer having the melting-point and inherent-viscosity characteristics of the copolymer defined in claim 1.

19. The method as in claim 18 wherein the olefin of (A) is 4-methyl-1-pentene and the olefin-substituted cycloalkane of (B) is vinylcyclohexane in the ratio of from about 20% to about 91% of the former to from about 80% to about 9% of the latter; the Ziegler-Natta catalyst, contained in an inert hydrocarbon solvent, comprises aluminum diethyl chloride and $TiCl_3$ in a molar ratio of at least 2 moles of the former per mole of the latter; the mole ratio of $TiCl_3$ to total monomers is about 0.03–0.04:1, respectively; the polymerization is pre-initiated by charging to the reaction mass, containing the total amount of catalytic material, a minor amount of the order of 11 to 18% of the total amount of monomers to be charged; the polymerization of the said minor amount of total monomers is continued for from 3 to 24 hours, after which the remainder of the 4-methyl-1-pentene and vinylcyclohexane is charged to the reaction mass and polymerization is continued thereby to obtain, after deactivation of the catalyst and isolation of the ultimate product, a copolymer having the melting-point and inherent-viscosity characteristics of the copolymer defined in claim 1, and which yields clear, gel-free solutions when dissolved in trichloroethylene at about 70°–80° C.

20. The method as in claim 9 wherein the inert hydrocarbon solvent is heptane.

References Cited

UNITED STATES PATENTS

| | | | |
|---|---|---|---|
| 3,029,215 | 4/1962 | Campbell | 260—33.8 |
| 3,058,963 | 10/1962 | Vandenberg | 260—88.2 |
| 3,091,601 | 3/1963 | Reding et al. | 260—88.2 |
| 3,147,238 | 9/1964 | Winkler et al. | 260—88.2 |
| 3,264,277 | 8/1966 | Winkler et al. | 260—88.2 |
| 3,269,996 | 8/1966 | Langer | 260—88.2 |
| 3,296,238 | 1/1967 | Van der Plas | 260—88.2 |

MORRIS LIEBMAN, *Primary Examiner.*

JULIUS FROME, *Examiner.*

L. T. JACOBS, *Assistant Examiner.*